Dec. 3, 1929.  S. FIELD  1,737,836
KNEE CASTER
Filed July 14, 1928
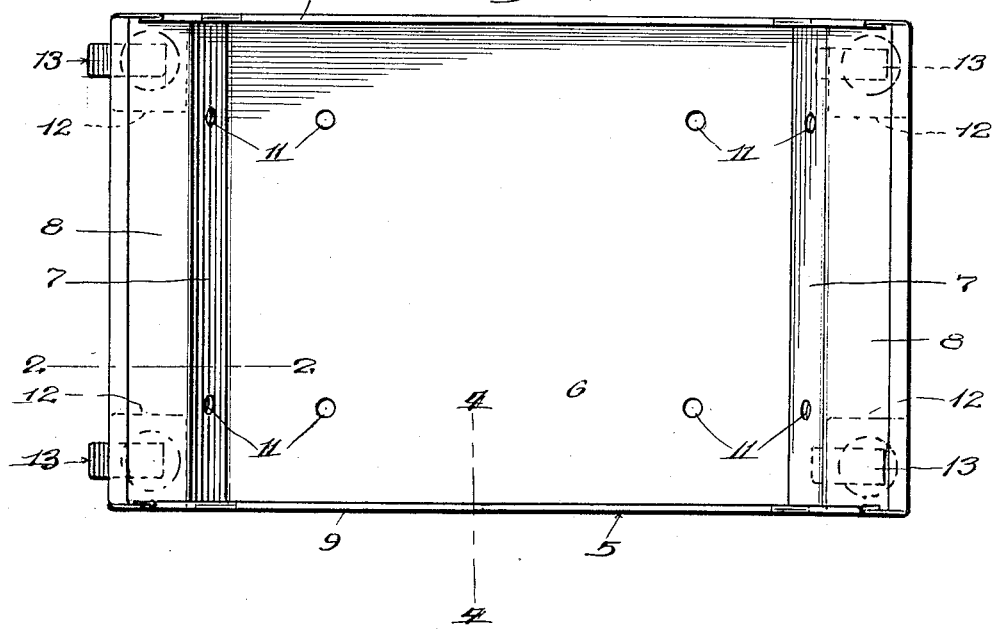
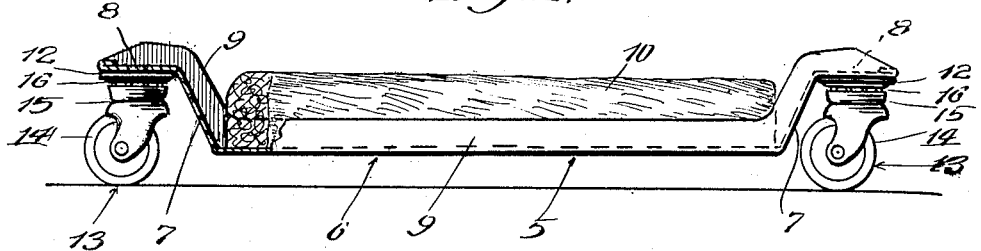
Inventor:
Sjonne Field,
by Charles O. Shurey
his Atty.

Patented Dec. 3, 1929

1,737,836

UNITED STATES PATENT OFFICE

SJONNE FIELD, OF CHICAGO, ILLINOIS

KNEE CASTER

Application filed July 14, 1928. Serial No. 292,653.

This invention relates to knee casters, and its principal object is to provide a simple, practical and comparatively inexpensive device upon which a person may kneel while scrubbing or washing floors, or while performing any other labor on floors. Another object is to provide a device which shall be light yet rugged and having a cushion or pad supporting member disposed in close proximity to the floor and supported by caster wheels, whereby the device may be freely moved over the surface of the floor.

With these and other objects and advantages in view, this invention consists in the several novel features of construction, arrangement and combination of parts hereinafter fully set forth and claimed.

The invention is clearly illustrated in the drawing accompanying this specification in which—

Figure 1 is a plan of a knee caster embodying a simple form of the present invention;

Fig. 2 is a view thereof partly in side elevation and partly in vertical longitudinal section, the line of section being indicated at 2—2 in Fig. 1;

Fig. 3 is an end view of the device; and

Fig. 4 is a detail vertical fragmental cross section taken on the line 4—4 of Fig. 1.

Referring to said drawing, which illustrates one embodiment of the present invention, the reference character 5 designates the main supporting member of the device which, as a preference, is composed of a sheet of light gauge sheet metal formed with a centrally located rectangular flat pad holding portion 6 from the ends of which extend upwardly inclined end walls 7 that terminate in flat horizontally extending end members 8.

The side edges of the main supporting member are bent upwards to form side flanges 9 which extend throughout the length of the main supporting member, and said flanges are doubled upon themselves, as seen in Fig. 4, to provide an increased thickness for the side flanges, thus permitting very light gauge material to be used, which when reinforced as above set forth, provides an extremely substantial and rugged supporting member. The end edges of the members 8 are doubled back upon themselves, as seen in Fig. 2, to reinforce the end edge portions of the main supporting member. The construction described provides a depressed shallow box like structure in which may be placed a pad or cushion 10, see Figs. 2 and 4, and, if desired, holes 11 may be provided in the bottom of the portion 6 and end walls 7 through which cords may be passed and tied around the pad or cushion to secure the same in place.

To the undersides of the end members 8 are secured the base plates 12 of casters 13. Said base plates 12 may be secured to the end members 8 by spot welding them thereto or by any other suitable means as is well understood. The base plates 12 are connected to the caster wheels 14 by forks 15, as usual, and antifriction members, such as balls or rollers 16, are provided between the base plates and forks as is customary in ball or roller bearing caster wheels. The caster wheels are placed at the four corners of the main supporting member and the parts are so proportioned that the pad supporting portion of the main supporting member is held in close proximity to the surface of the floor upon which the device rests.

In use, a person kneels upon the pad or cushion while working upon the floor, and because of the caster wheel arrangement, the person may readily move the device about while kneeling upon the same. Furthermore, by reason of the depressed pad supporting portion of the device, the knees are not raised far above the floor, and, as a consequence, a very comfortable support is provided for the knees of the person scrubbing, washing or performing other work upon the floor.

More or less variation of the exact details of construction is possible without departing from the spirit of this invention. I desire, therefore, not to limit myself to the exact form of the construction shown and described, but intend, in the following claim, to point out all of the invention disclosed herein.

I claim as new, and desire to secure by Letters Patent:

As a new article of manufacture, a knee caster comprising a sheet metal knee pad supporting member formed with a rectangular pad holding portion, the ends of which have upwardly bent portions forming end walls that terminate in outwardly bent horizontal portions and the side edge portions of the rectangular portion being bent up to form side flanges which extend from end to end of the supporting member, and caster wheels secured to said horizontal portions and supporting the pad supporting portion in close proximity to the surface upon which the device rests.

SJONNE FIELD.